(12) United States Patent
Isokawa

(10) Patent No.: US 9,093,085 B1
(45) Date of Patent: Jul. 28, 2015

(54) LASER CONTROLLER FOR HEAT-ASSISTED MAGNETIC RECORDING DEVICE

(71) Applicant: Kabushiki Kaisha Toshiba, Minato-ku, Tokyo (JP)

(72) Inventor: Hiroshi Isokawa, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/336,610

(22) Filed: Jul. 21, 2014

(30) Foreign Application Priority Data

Feb. 6, 2014 (JP) ................................ 2014-021657

(51) Int. Cl.
  *G11B 11/00* (2006.01)
  *G11B 7/1263* (2012.01)
  *G11B 11/105* (2006.01)

(52) U.S. Cl.
  CPC ........ *G11B 7/1263* (2013.01); *G11B 11/10595* (2013.01); *G11B 11/1053* (2013.01); *G11B 11/10506* (2013.01)

(58) Field of Classification Search
  None
  See application file for complete search history.

(56) References Cited

U.S. PATENT DOCUMENTS

| 5,381,396 | A | * | 1/1995 | Tanaka et al. | 369/13.24 |
| 5,457,666 | A | * | 10/1995 | Toda et al. | 369/13.24 |
| 5,469,422 | A | * | 11/1995 | Sohmuta | 369/13.24 |
| 5,513,165 | A | * | 4/1996 | Ide et al. | 369/13.24 |
| 6,775,218 | B1 | * | 8/2004 | O'Neill et al. | 369/13.24 |
| 7,535,803 | B2 | | 5/2009 | Murakami | |
| 8,264,917 | B2 | | 9/2012 | Nakano et al. | |
| 8,279,720 | B2 | | 10/2012 | Kimura | |
| 8,315,128 | B1 | | 11/2012 | Wilson et al. | |
| 8,369,191 | B2 | * | 2/2013 | Shimazawa | 369/13.24 |
| 8,503,125 | B2 | | 8/2013 | Contreras et al. | |
| 2003/0030719 | A1 | * | 2/2003 | Shimizu | 369/13.24 |
| 2004/0190385 | A1 | * | 9/2004 | Shimizu | 369/13.24 |
| 2012/0243390 | A1 | | 9/2012 | Lennard et al. | |

FOREIGN PATENT DOCUMENTS

| JP | 2006-073175 A | 3/2006 |
| JP | 2011-076646 A | 4/2011 |
| JP | 2012-053950 A | 3/2012 |
| JP | 2012-248266 A | 12/2012 |
| JP | 2013-143177 A | 7/2013 |

* cited by examiner

*Primary Examiner* — Tan X Dinh
(74) *Attorney, Agent, or Firm* — White & Case LLP

(57) ABSTRACT

According to one embodiment, there is provided a magnetic disk device including a light source, a light irradiation element, and a controller. The light irradiation element is configured to receive light from the light source to irradiate light onto a magnetic disk. The controller is configured to switch between a first control and a second control according to a pulse width of data to be written onto the magnetic disk. The first control keeps an output of the light source at a first value. The second control makes the output of the light source change periodically between the first value and a second value lower than the first value.

20 Claims, 10 Drawing Sheets

LASER CONTROLLER FOR HEAT-ASSISTED MAGNETIC RECORDING DEVICE

CROSS-REFERENCE TO RELATED APPLICATIONS

This application is based upon and claims the benefit of priority from Japanese Patent Application No. 2014-021657, filed on Feb. 6, 2014; the entire contents of which are incorporated herein by reference.

FIELD

Embodiments described herein relate generally to a magnetic disk device and a control method.

BACKGROUND

In these years, a heat assist recording scheme is attracting attention as a technology that enables high density magnetic recording of a 1 Tbit/inch$^2$ class. In the heat assist recording scheme, laser light generated by a light source (laser diode) is converted by a near field transducer into near-field light to be irradiated onto part of the surface of a magnetic disk so as to raise the temperature of the magnetic disk locally. Then, by applying a magnetic field to the temperature-raised part of the magnetic disk by a magnetic field generating element, data is recorded magnetically. At this time, it is desired to improve data reliability.

DETAILED DESCRIPTION

In general, according to one embodiment, there is provided a magnetic disk device including a light source, a light irradiation element, and a controller. The light irradiation element is configured to receive light from the light source to irradiate light onto a magnetic disk. The controller is configured to switch between a first control and a second control according to a pulse width of data to be written onto the magnetic disk. The first control keeps an output of the light source at a first value. The second control makes the output of the light source change periodically between the first value and a second value lower than the first value.

Exemplary embodiments of a magnetic disk device will be explained below in detail with reference to the accompanying drawings. The present invention is not limited to the following embodiments.

Embodiment

Figure 1:
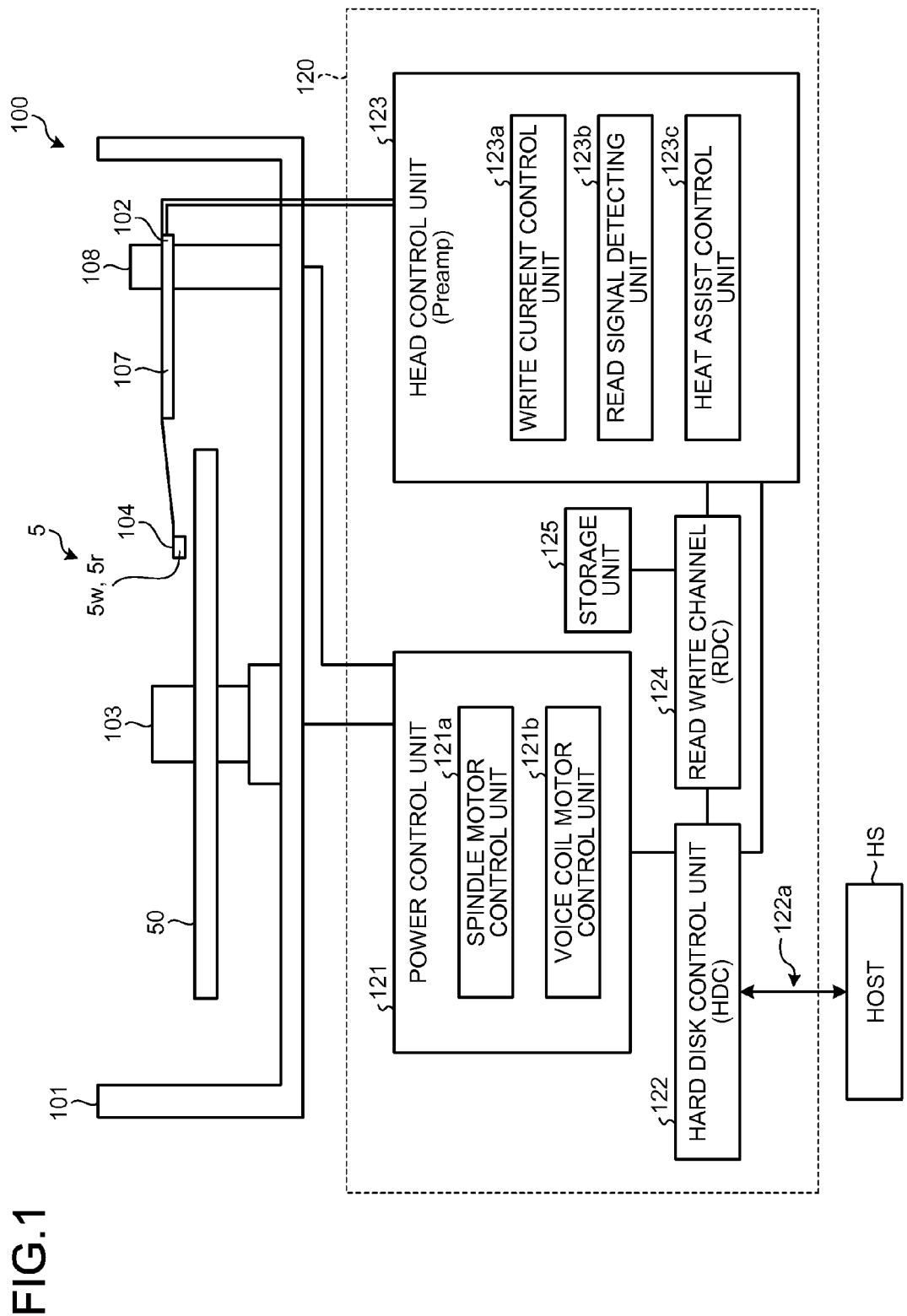
FIG. 1 is a diagram showing configuration of the magnetic disk device according to an embodiment.
Figure 2:
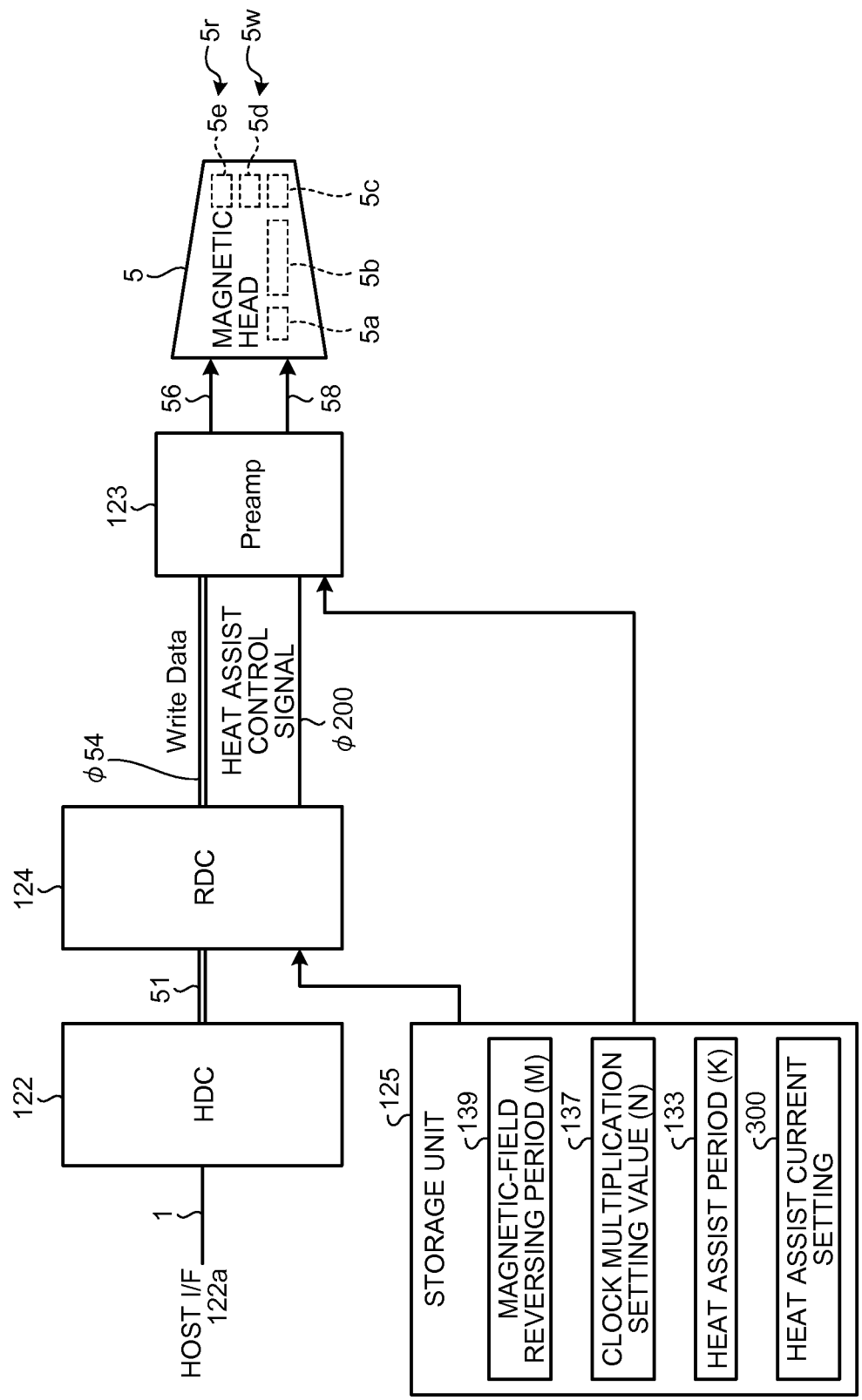
FIG. 2 is a diagram showing configuration relating to an RDC in the embodiment.

The magnetic disk device 100 according to the present embodiment will be described in outline using FIGS. 1 and 2. FIG. 1 is a diagram showing configuration of the magnetic disk device according to the embodiment. FIG. 2 is a diagram showing configuration relating to data recording by the magnetic disk device according to the embodiment.

A magnetic disk 50 is a disk-shaped recording medium on which to record a variety of information and is rotationally driven by a spindle motor 103. The magnetic disk 50 has a perpendicular recording layer anisotropic in a direction perpendicular to the surface thereof. The magnetic disk 50 has multiple tracks in a concentric-circle shape with a point near the rotational center of the spindle motor 103 as their center.

Reading from and writing onto the magnetic disk 50 is performed by means of a magnetic head 5 provided on one end of an arm 107 that is a head support mechanism via a head slider 104. The magnetic head 5 includes a recording head 5w and a read head 5r.

The recording head 5w moves relative to the surface of the magnetic disk 50 in a down track direction with keeping in a state of being lifted slightly from the surface of the magnetic disk 50 by lift generated by the rotation of the magnetic disk 50 so as to record information onto the magnetic disk 50 by a magnetic field generating element 5d.

At this time, in the recording head 5w, according to the heat assist recording scheme, laser light generated by a light source (e.g., LD: Laser diode) 5a is guided by a waveguide 5b to a near field transducer (light irradiation element) 5c, which converts the laser light into near-field light. In the recording head 5w, the converted near-field light is irradiated from the near field transducer 5c onto part of the surface of the magnetic disk 50 to raise the temperature of the magnetic disk 50 locally, and a magnetic field is applied to the temperature-raised part by the magnetic field generating element 5d to record information magnetically. For example, the magnetic field generating element 5d writes data onto the magnetic disk 50 with reversing the direction of the magnetic field for magnetization or not, depending on whether the level of data to be written is 1 or 0. That is, the recording head 5w is used for write operation for the magnetic disk 50 according to the heat assist recording scheme.

Note that the light source 5a may be provided outside the magnetic head 5 as long as the configuration is made such that laser light can be supplied to the near field transducer (light irradiation element) 5c via the waveguide 5b.

The read head 5r moves relative to the surface of the magnetic disk 50 in a down track direction with keeping in the state of being lifted slightly from the surface of the magnetic disk 50 by lift generated by the rotation of the magnetic disk 50 so as to read information recorded on the magnetic disk 50 by a magnetoresistive element 5e. That is, the read head 5r is used for read operation for the magnetic disk 50.

The arm 107 pivots on an arc with a shaft 108 as the center by drive by a voice coil motor 102, which is a head drive mechanism, provided at the other end of the arm 107 so that the recording head 5w and the read head 5r seek in a cross-track direction of the magnetic disk 50 to switch tracks subject to reading or writing. The magnetic disk 50, the magnetic head 5, the voice coil motor 102, and the spindle motor 103 are housed in a case 101.

As shown in FIG. 1, the magnetic disk device 100 has a magnetic recording control unit 120. The magnetic recording control unit 120 has a head control unit (preamp) 123, a power control unit 121, a read write channel (RDC) 124, a hard disk control unit (HDC) 122, and a storage unit 125. The head control unit 123 has a write current control unit 123a, a read signal detecting unit 123b, and a heat assist control unit 123c. The power control unit 121 has a spindle motor control unit 121a and a voice coil motor control unit 121b. The storage unit 125 is constituted by, e.g., a RAM, ROM, or nonvolatile memory.

Figure 7:
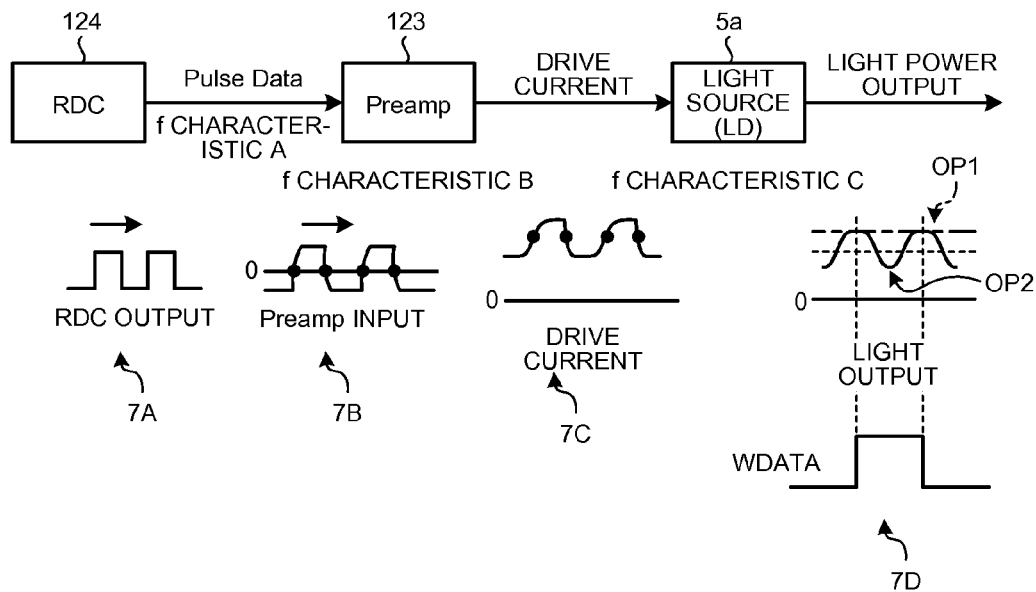
FIG. 7 is a diagram for explaining influence of a frequency characteristic in the embodiment.

In the write operation according to the heat assist recording scheme, control (first control) is applied which records information onto the magnetic disk 50 by modulating the magnetic field from the magnetic field generating element 5d with heating the magnetic disk 50 by near-field light corresponding to constant laser power. The first control is control which keeps the output of the light source 5a at a first value OP1 as indicated by, e.g., the dot-dashed line in 7D of FIG. 7. FIG. 7 is a diagram for explaining influence of a frequency characteristic.

If the first control is performed in a fixed manner, at the time of recording, constant light power continues to be supplied from the light source 5a to the near field transducer 5c. Thus, the light source 5a and the near field transducer 5c are likely to degrade due to heat generation by themselves, and the reliability of each of the light source 5a and the near field transducer 5c may decrease (refer to FIGS. 10, 11). Further, since a constant drive current needs to continue to be supplied to the light source 5a to make the light source 5a generate laser light, power consumption by the light source 5a is likely to increase.

As another control in the write operation according to the heat assist recording scheme, control (second control) is applied which makes laser light from the light source 5a change in pulses (e.g., intermittently) synchronously with the polarity reversing of the magnetic field generated from the magnetic field generating element 5d while irradiating it. The second control is control which makes the output of the light source 5a change periodically between the first value OP1 and a second value OP2 as shown by, e.g., the solid line in 7D of FIG. 7. The second value OP2 is lower than the first value OP1.

If the second control is performed in a fixed manner, a constant current need not be continuously applied to the light source 5a. Thus, compared with the case of performing the first control in a fixed manner, the degradation due to heat generation of the near field transducer 5c receiving light from the light source 5a can be suppressed, and hence the lifetime of the near field transducer 5c can be elongated, thus suppressing a decrease in the reliability of the near field transducer 5c. Further, because the time-averaged amount of current supplied to the light source 5a can be reduced, power consumption in the light source 5a can be reduced.

However, if the second control is performed in a fixed manner, the reliability of data written on the magnetic disk 50 may be decreased.

In the second control, a control signal (Pulse Data) to control the drive current of the light source 5a is supplied from the RDC 124 to the preamp 123. The rectangular waveform output from the RDC 124, shown in 7A of FIG. 7, has deteriorated in shape when input into the preamp 123 as shown in 7B of FIG. 7 due to the influence of the frequency characteristic (f characteristic A) of the transmission path for laser drive control. Further, the waveform of the drive current supplied from the preamp 123 to the light source 5a has deteriorated in shape as shown in 7C of FIG. 7 due to the influence of the frequency characteristic (f characteristic B) of the preamp 123. Also, the output waveform of laser light emitted from the light source 5a has further deteriorated in shape as shown in 7D of FIG. 7 due to the influence of the frequency characteristic (f characteristic C) of the light source 5a.

Hence, in the case where the second control is performed in a fixed manner, if the finally-obtained frequency characteristic of the transmission path for laser control is at or below that of the signal transmission path for magnetic field control, then the laser-control current value changes according to the control frequency, and hence it is difficult to obtain signal quality uniform across the entire frequency band of data to be recorded on the magnetic disk device 100. For example, compared with an ideal waveform, the output waveform of laser light is more likely to decay in amplitude when the pulse width of data WDATA to be written onto the magnetic disk 50 is shorter. Thus, as the pulse width of data WDATA becomes shorter, the reliability of data actually written on the magnetic disk 50 may decrease with respect to data WDATA to be written (see FIG. 8).

Accordingly, in the present embodiment, the magnetic disk device 100 switches between the first control and the second control according to the pulse width of data to be written onto the magnetic disk 50, thereby improving the reliability of data written on the magnetic disk 50 while elongating the lifetimes of the light source 5a and the near field transducer 5c and lowering the power consumption of the light source 5a.

In the magnetic disk device 100, as shown in FIG. 2, the RDC (controller) 124 switches between the first control and the second control according to a command and/or data 51 received from the HDC 122.

Specifically, the HDC 122 generates the predetermined command and/or data 51 according to a command and/or data 1 received from a host HS via a host I/F 122a and outputs to the RDC 124. The RDC 124 performs control according to the predetermined command and/or data 51. For example, when receiving a write command, the RDC 124 generates data φ54 to be written onto the magnetic disk 50 and outputs to the preamp 123.

Further, the RDC 124 generates a heat assist control signal φ200 and outputs to the preamp 123. The heat assist control signal φ200 is a signal to control the drive current for the light source 5a, which is to be generated in the preamp 123.

At this time, the RDC 124 generates the heat assist control signal φ200 while switching between the first control and the second control according to the pulse width of data φ54 to be written. The first control is control which keeps the output of the light source 5a at the first value OP1. The second control is control which makes the output of the light source 5a change periodically between the first value OP1 and the second value OP2. The second value OP2 is lower than the first value OP1 and is, e.g., a value at which the output of the light source 5a is off. That is, in the second control the RDC 124 controls the light source 5a such that light is intermittently output from the light source 5a.

For example, when the pulse width of data φ54 to be written onto the magnetic disk 50 is less than a first threshold, the RDC 124 performs the first control. When the pulse width of data φ54 is greater than or equal to the first threshold, the RDC 124 performs the second control.

Here, a magnetic-field reversing period 139 is stored in the storage unit 125, and the RDC 124 refers to the storage unit 125 to acquire the magnetic-field reversing period 139. The RDC 124 obtains the first threshold according to the magnetic-field reversing period 139. The RDC 124 compares the time (first time) from an edge timing to the next edge timing of the pulse of data φ53 subject to writing (see FIG. 3) with the first threshold. According to the comparison result, when the first time is less than the first threshold, the RDC 124 keeps the output of the light source 5a at the first value OP1. On the other hand, when the first time is greater than or equal to the first threshold, the RDC 124 switches the output of the light source 5a from the first value OP1 to the second value OP2.

Further, the storage unit 125 stores a heat assist period 133. The RDC 124 refers to the storage unit 125 to acquire the heat assist period 133. The RDC 124 obtains the second threshold according to the heat assist period 133. The RDC 124 compares the elapsed time from the timing when it has switched the output of the light source 5a from the first value OP1 to the second value OP2 with the second threshold. According to the comparison result, when the elapsed time is less than the second threshold, the RDC 124 keeps the output of the light source 5a at the second value OP2. When the elapsed time is greater than or equal to the second threshold, the RDC 124 switches the output of the light source 5a from the second value OP2 to the first value OP1.

Further, the RDC 124 can set a third threshold, and, for example, the third threshold can be set to be twice the second threshold. The RDC 124 compares the time (second time) from the timing when it has switched the output of the light source 5a from the second value OP2 to the first value OP1 until an edge timing of the pulse of data C53 subject to writing (see FIG. 3) with the third threshold. According to the comparison result, when the second time is less than the third threshold, the RDC 124 keeps the output of the light source 5a at the first value OP1. When the second time is greater than or equal to the third threshold, the RDC 124 switches the output of the light source 5a from the first value OP1 to the second value OP2.

Note that the storage unit 125 stores a clock frequency-multiplication setting value 137 and that the RDC 124 refers to the storage unit 125 to acquire the clock frequency-multiplication setting value 137. When generating the heat assist control signal φ200, the RDC 124 can use the clock frequency-multiplication setting value 137.

The preamp 123 generates a write current 56 according to data φ54 to be written and supplies to the magnetic head 5. Thus, the magnetic field generating element 5d generates the magnetic field according to the write current 56 to write data onto the magnetic disk 50. At this time, the preamp 123 acquires a heat assist current setting 300 from the storage unit 125. The preamp 123 generates a drive current (drive signal) 58 according to the heat assist control signal φ200 and the heat assist current setting 300 and supplies to the magnetic head 5. Thus, laser light generated by the light source 5a is guided by the waveguide 5b to the near field transducer 5c, which converts the laser light into near-field light. The converted near-field light is irradiated from the near field transducer (light irradiation element) 5c onto part of the surface of the magnetic disk 50 to raise the temperature of the magnetic disk 50 locally, and a magnetic field is applied to the temperature-raised part by the magnetic field generating element 5d to record data magnetically.

Figure 3:
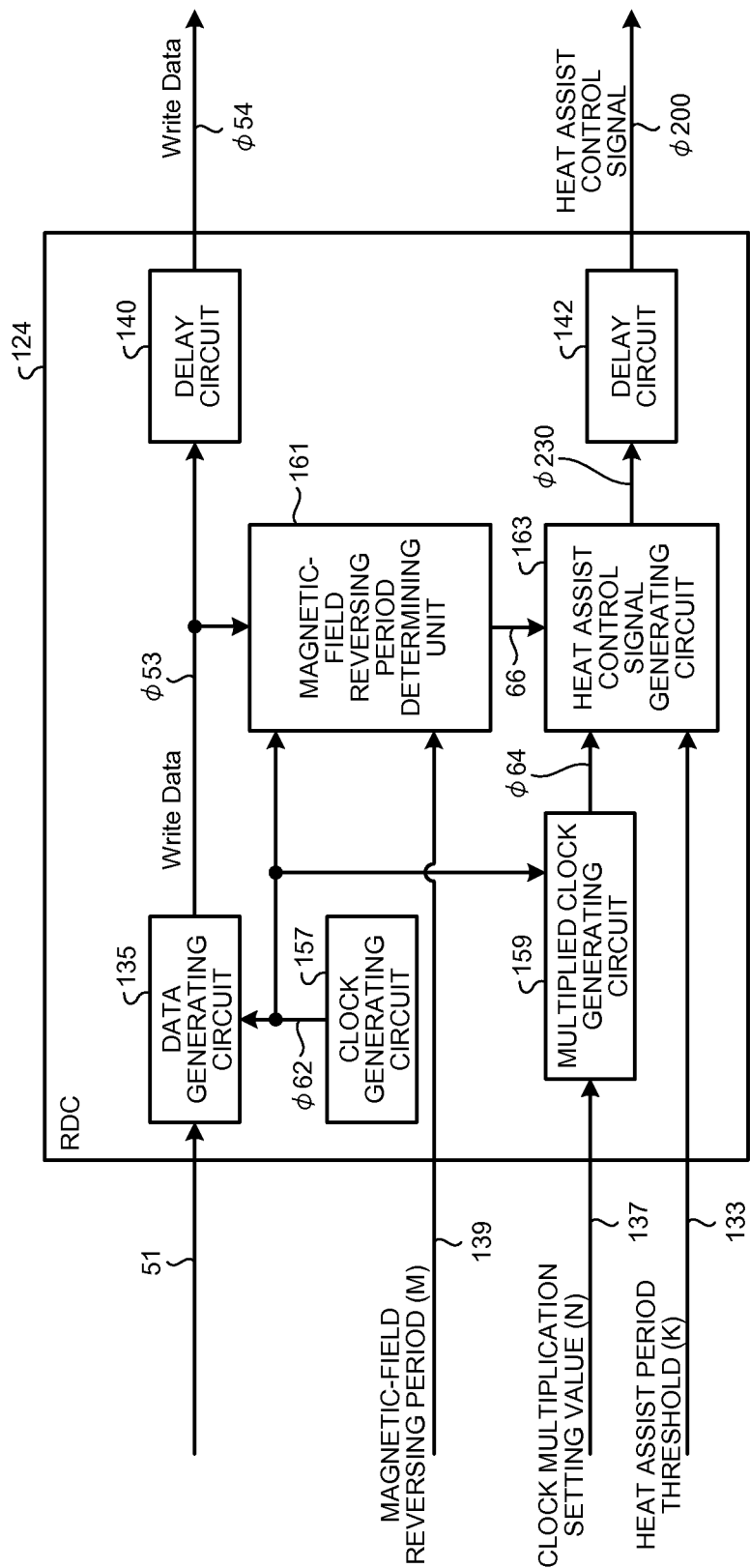
FIG. 3 is a diagram showing configuration of the RDC in the embodiment.
Figure 5:
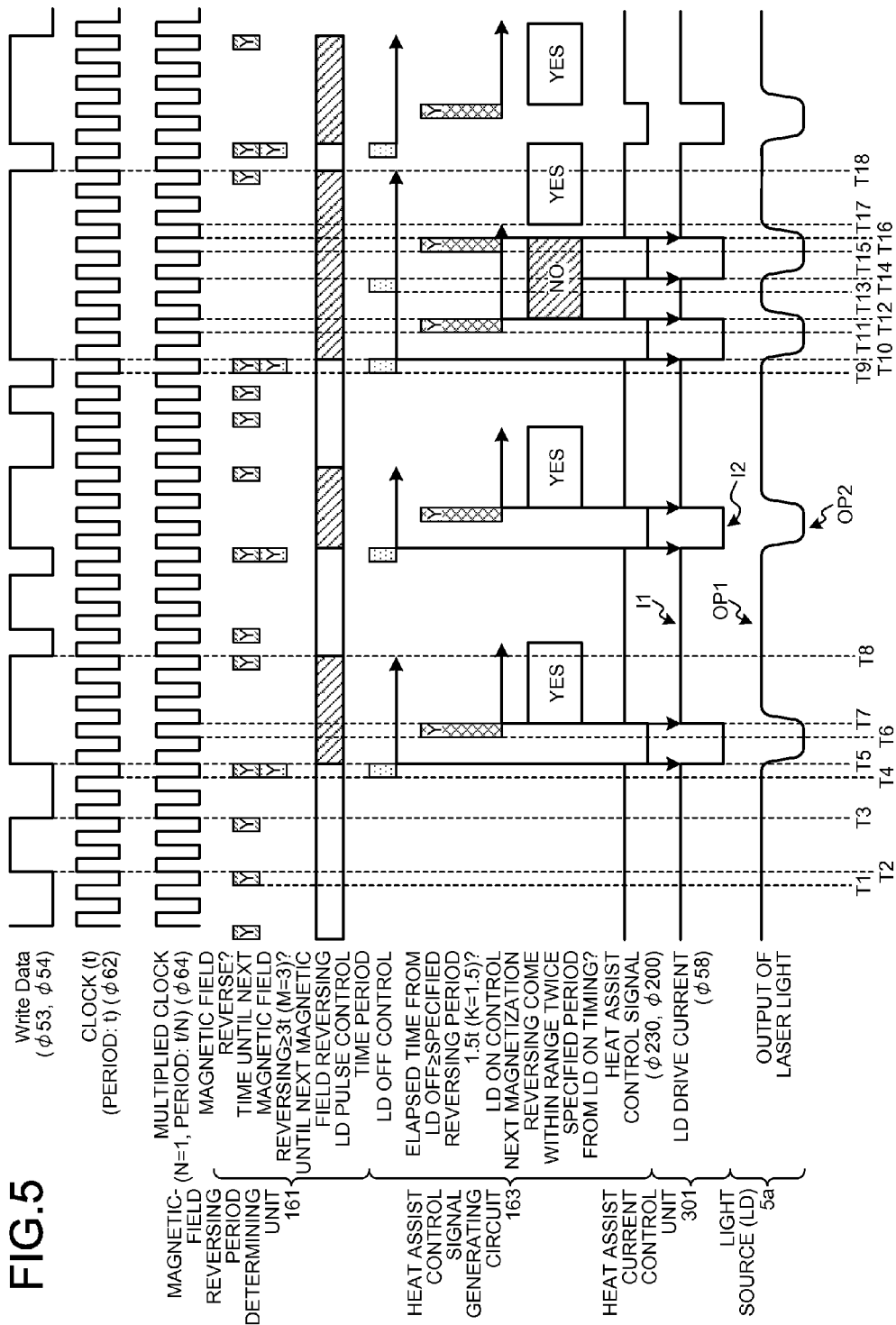
FIG. 5 is a waveform diagram showing operation of the magnetic disk device according to the embodiment.

Next, the configuration and operation of the RDC 124 will be described using FIGS. 3 and 5. FIG. 3 is a diagram showing the configuration of the RDC 124. FIG. 5 is a waveform diagram showing operation of the magnetic disk device 100 including the RDC 124.

The RDC 124 mainly has a configuration for generating record data to be recorded onto the magnetic disk 50, that is, data φ54 to be written and a configuration for generating the heat assist control signal φ200 to control a drive current to be generated in the light source 5a. Specifically, the RDC 124 has a clock generating circuit (first clock generating unit) 157, a data generating circuit (data generating unit) 135, a frequency-multiplied clock generating circuit (second clock generating unit) 159, a magnetic-field reversing period determining unit 161, a heat assist control signal generating circuit 163, a delay circuit (delay unit) 140, and a delay circuit (delay unit) 142.

The clock generating circuit 157 generates a clock (first clock) φ62 (period=t). The clock generating circuit 157 supplies the generated clock φ62 to the data generating circuit 135, the magnetic-field reversing period determining unit 161, and the frequency-multiplied clock generating circuit 159.

The data generating circuit 135 receives a predetermined command and/or data 51 from the HDC 122 and the clock φ62 from the clock generating circuit 157. For example, the data generating circuit 135 generates data φ53 subject to writing onto the magnetic disk 50 synchronously with the clock φ62 according to the write command and/or data 51 from the HDC 122. The data generating circuit 135 supplies the generated data φ53 to the delay circuit 140 and the magnetic-field reversing period determining unit 161.

The frequency-multiplied clock generating circuit 159 receives the clock φ62 (period=t, frequency=1/t) from the clock generating circuit 157. The frequency-multiplied clock generating circuit 159 acquires the clock frequency-multiplication setting value (N) 137 from the storage unit 125. The frequency-multiplied clock generating circuit 159 frequency-multiplies the clock φ62 (e.g., by N) according to the clock frequency-multiplication setting value (N) 137 to generate a frequency-multiplied clock (second clock) φ64 (period=t/N, frequency=N/t). The frequency-multiplied clock generating circuit 159 supplies the frequency-multiplied clock φ64 to the heat assist control signal generating circuit 163.

The magnetic-field reversing period determining unit 161 receives the data φ53 subject to writing onto the magnetic disk 50 from the data generating circuit 135 and the clock φ62 from the clock generating circuit 157. The determining unit 161 acquires the magnetic-field reversing period (M) 139 from the storage unit 125. The determining unit 161 obtains the first threshold according to the magnetic-field reversing period (M) 139. For example, the determining unit 161 multiplies the magnetic-field reversing period (M) 139 by the period t of the clock φ62 to obtain the multiplying result (Mt) as the first threshold. The determining unit 161 compares the pulse width of the data φ53 subject to writing with the first threshold (Mt) synchronously with the clock φ62 to determine whether the pulse width of the data φ53 is greater or equal to the first threshold (Mt) according to the comparison result.

Further, the magnetic-field reversing period determining unit 161 counts the number 'm' of clocks during the time (first time) from the timing when the magnetic field reverses until the timing when the magnetic field reverses the next time based on the clock φ62. The determining unit 161 multiplies the number 'm' of clocks by the period 't' of the clock φ62 to obtain the multiplying result (mt) as the length of time until the magnetic field reverses the next time. The determining unit 161 compares the length of time (mt) until the magnetic field reverses the next time with the first threshold (Mt) and determines whether the length of time (mt) until the magnetic field reverses the next time is greater than or equal to the first threshold (Mt) according to the comparison result.

FIG. 5 shows, for example, the case where M=3, N=1, and K=1.5.

At timing T1, the determining unit 161 counts the number 'm' (=2) of clocks during the first time from timing T2 until timing T3 and compares the first time (2 t) with the first threshold (3 t) to determine that the first time (2 t) is less than the first threshold (3 t).

At timing T4, the determining unit 161 counts the number 'm' (=4) of clocks during the first time from timing T5 until timing T8 and compares the first time (4 t) with the first threshold (3 t) to determine that the first time (4 t) is greater than or equal to the first threshold (3 t).

At timing T9, the determining unit 161 counts the number 'm' (=7) of clocks during the first time from timing T10 until timing T18 and compares the first time (7 t) with the first threshold (3 t) to determine that the first time (7 t) is greater than or equal to the first threshold (3 t).

The magnetic-field reversing period determining unit 161 shown in FIG. 3 supplies a magnetic-field reversing period determination value 66 as the determining result to the heat assist control signal generating circuit 163. Further, if the length of time (mt) until the magnetic field reverses the next time is greater than or equal to the first threshold (Mt), the determining unit 161 supplies the length of time (mt) until the magnetic field reverses the next time to the generating circuit 163.

The heat assist control signal generating circuit 163 receives the frequency-multiplied clock φ64 from the frequency-multiplied clock generating circuit 159 and the magnetic-field reversing period determination value 66 from the determining unit 161. The generating circuit 163 acquires the heat assist period (K) 133 from the storage unit 125.

If the magnetic-field reversing period determination value 66 indicates that the time until the timing when the magnetic field reverses the next time is greater than or equal to the specified length (mt>Mt), the generating circuit 163 receives the length of time (mt) until the magnetic field reverses the next time. In response to the reception of the length of time (mt) until the magnetic field reverses the next time, the generating circuit 163 changes the level of a heat assist control signal φ230 from high (active) to low (inactive) to output to the delay circuit 142. That is, the generating circuit 163 switches the control operation of the RDC 124 from the first control to the second control.

For example, at each of timings T4, T9 in FIG. 5, the heat assist control signal generating circuit 163 receives the length of time (mt) until the magnetic field reverses the next time and in response to this, sets an "LD OFF control" flag to be active.

At each of timings T5, T10, in response to the "LD OFF control" flag being active, the generating circuit 163 changes the level of the heat assist control signal φ230 from high (active) to low (inactive). Also, the generating circuit 163 sets the "LD OFF control" flag to be non-active.

The heat assist control signal generating circuit 163 shown in FIG. 3 obtains the second threshold according to the heat assist period (K) 133. For example, the generating circuit 163 multiplies the period t/N of the frequency-multiplied clock φ64 by the heat assist period (K) 133 to obtain the multiplying result (K×t/N) as the second threshold.

The heat assist control signal generating circuit 163 compares the elapsed time from the timing when it has changed the level of the heat assist control signal φ230 from high to low with the second threshold. The generating circuit 163 counts the number 'k' of clocks during the elapsed time based on the frequency-multiplied clock φ64. The generating circuit 163 multiplies the number 'k' of clocks by the period t/N of the frequency-multiplied clock φ64 to obtain the multiplying result (k×t/N) as the elapsed time. The generating circuit 163 compares the elapsed time (k×t/N) with the second threshold (K×t/N) and determines whether the elapsed time (k×t/N) is greater than or equal to the second threshold (K×t/N) according to the comparison result. That is, the second threshold (K×t/N) is the time period for which the level of the heat assist control signal φ230 should be kept low.

At the timing when the elapsed time (k×t/N) has become greater than or equal to the second threshold (K×t/N), the generating circuit 163 changes the level of the heat assist control signal φ230 from low (inactive) to high (active) to output to the delay circuit 142.

For example, at timing T6 shown in FIG. 5, the heat assist control signal generating circuit 163 compares the elapsed time (1.5×t/N) at timing T7 with the second threshold (1.5× t/N) and determines that the elapsed time (1.5×t/N) is greater than or equal to the second threshold (1.5×t/N). Accordingly, the generating circuit 163 sets the "LD ON control" flag to be active. Also at timing T11 shown in FIG. 5, the same process is executed.

At each of timings T7, T12, in response to the "LD ON control" flag being active, the generating circuit 163 changes the level of the heat assist control signal φ230 from low (inactive) to high (active). Also, the generating circuit 163 sets the "LD ON control" flag to be non-active.

Further, the heat assist control signal generating circuit 163 shown in FIG. 3 counts down from the length of time (mt) until the magnetic field reverses the next time during the time from when outputting low (inactive) as the heat assist control signal φ230 to when outputting high (active) to calculate the remaining time (second time) until the magnetic field reverses the next time.

That is, the heat assist control signal generating circuit 163 subtracts the second threshold (K×t/N) from the length of time (mt) until the magnetic field reverses the next time to obtain the remaining time (second time) A (=mt−K×t/N) until the magnetic field reverses the next time. The generating circuit 163 can set the third threshold and, for example, if the off-duty in the second control is set at 50%, the third threshold can be set to be twice the second threshold (2×K×t/N), the second threshold being the time period for which the level of the heat assist control signal φ230 should be kept low.

The heat assist control signal generating circuit 163 compares the second time with the third threshold and according to the comparison result, if the second time is less than the third threshold, keeps the level of the heat assist control signal φ230 high to output to the delay circuit 142. That is, the generating circuit 163 switches the control operation of the RDC 124 from the second operation to the first operation.

On the other hand, if the second time is greater than or equal to the third threshold, at the timing when the second threshold has elapsed from the timing when the heat assist control signal φ230 changed from low to high, the generating circuit 163 changes the level of the heat assist control signal φ230 from high to low to output to the delay circuit 142. That is, the generating circuit 163 keeps the control operation of the RDC 124 at the second operation.

For example, at timing T7 shown in FIG. 5, the heat assist control signal generating circuit 163 compares the second time (2.5 t) with the third threshold (3 t) and determines that the second time (2.5 t) is less than the third threshold (3 t)

according to the comparison result. Accordingly, the generating circuit 163 keeps the level of the heat assist control signal φ230 high.

At timing T11, the generating circuit 163 compares the second time (5.5 t) with the third threshold (3 t) and determines that the second time (5.5 t) is greater than or equal to the third threshold (3 t) according to the comparison result. Accordingly, the generating circuit 163 changes the level of the heat assist control signal φ230 from high to low at timing T14, when the second time (1.5 t) has elapsed from timing T12.

If changing the level of the heat assist control signal φ230 from high to low, the heat assist control signal generating circuit 163 shown in FIG. 3, at the timing when the second threshold has elapsed from the timing when it changed the heat assist control signal φ230 from high to low, changes the level of the heat assist control signal φ230 from low to high to output to the delay circuit 142. Then, the generating circuit 163 compares the remaining time (second time) from the timing when the heat assist control signal φ230 changed from low to high until the magnetic field reverses the next time with the third threshold again and according to the comparison result, if the second time is less than the third threshold, keeps the level of the heat assist control signal φ230 high to output to the delay circuit 142. That is, the generating circuit 163 switches the control operation of the RDC 124 from the second operation to the first operation.

As shown in, e.g., FIG. 5, the heat assist control signal generating circuit 163 changes the heat assist control signal φ230 from low to high at timing T16, when the second threshold (1.5 t) has elapsed from timing T14.

At timing T17, the generating circuit 163 compares the second time (2 t) with the third threshold (3 t) and determines that the second time (2 t) is less than the third threshold (3 t) according to the comparison result. Accordingly, the generating circuit 163 keeps the level of the heat assist control signal φ230 high.

The delay circuit 140 receives the data φ53 subject to writing from the data generating circuit 135. The delay circuit 140 delays the data φ53 by a predetermined delay amount to generate the data φ54 to be written. The delay circuit 140 outputs the data φ54 to the preamp 123.

The delay circuit 142 receives the heat assist control signal φ230 from the heat assist control signal generating circuit 163. The delay circuit 142 delays the heat assist control signal φ230 by a predetermined delay amount to generate the heat assist control signal φ200. The delay circuit 142 outputs the heat assist control signal φ200 to the preamp 123.

Note that the predetermined delay amount in the delay circuit 140 and the predetermined delay amount in the delay circuit 142 are adjusted such that the data φ54 to be written and the heat assist control signal φ200 are synchronous in a phase relation shown in FIG. 5, taking into account the time required for the processes in the magnetic-field reversing period determining unit 161 and the heat assist control signal generating circuit 163 (e.g., time corresponding to the maximum pulse width in the data φ53 subject to writing).

For example, while counting the pulse width of the data φ53 subject to writing during the time from timing T10 to timing T18 finishes at timing T18, the magnetic-field reversing period determining unit 161 needs to realize the count at timing T9. Hence, the predetermined delay amount in the delay circuit 140 is made greater than the predetermined delay amount in the delay circuit 142 by an amount that can be made greater than or equal to the time from timing T10 to timing T18. Thus, the determining unit 161 can realize the count value for the pulse width of the data φ53 subject to writing from timing T10 to timing T18 at timing T9 and can make the data φ54 to be written and the heat assist control signal φ200 synchronous in a phase relation shown in FIG. 5 when they are output from the RDC 124.

Figure 4:
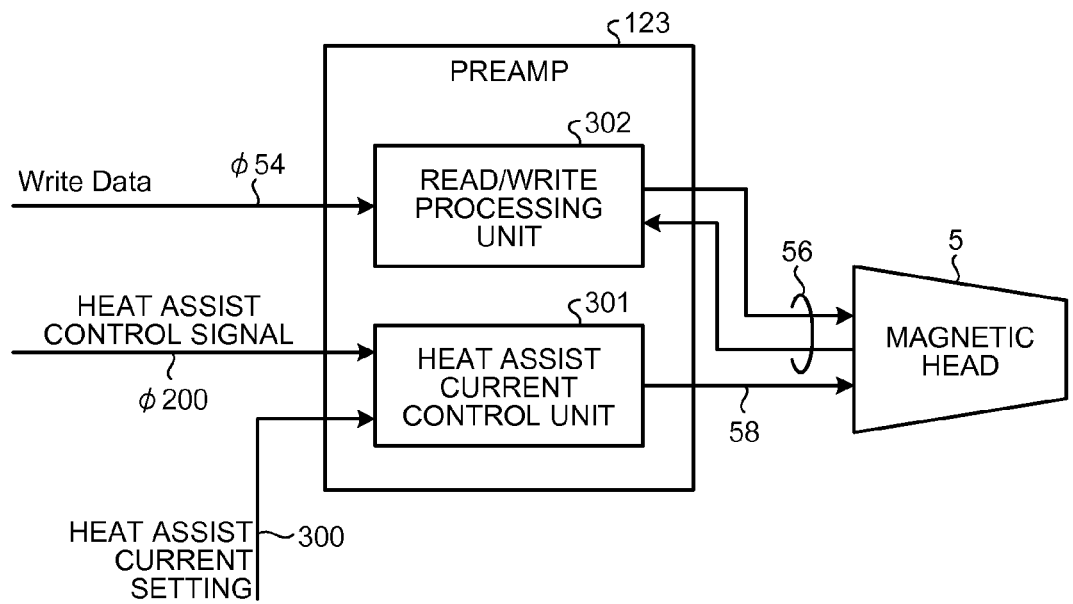
FIG. 4 is a diagram showing configuration of a preamp in the embodiment.

Next, the configuration and operation of the preamp 123 will be described using FIGS. 4 and 5. FIG. 4 is a diagram showing configuration of the preamp 123. FIG. 5 is a diagram showing operation of the magnetic disk device 100 including the preamp 123.

The preamp 123 has a read/write processing unit 302 and a heat assist current control unit 301.

The read/write processing unit 302 receives the data φ54 to be written from the RDC 124. The read/write processing unit 302 generates a write current 56 according to the data φ54 to supply to the magnetic head 5. Thus, the magnetic field generating element 5d generates a magnetic field according to the write current 56 to write data onto the magnetic disk 50.

The heat assist current setting 300 is stored in the storage unit 125, and the heat assist current control unit 301, referring to the storage unit 125, acquires the heat assist current setting 300. The heat assist current setting 300 is setting information denoting a relation between the level of the heat assist control signal and the value of the drive current to be generated. In the heat assist current setting 300, the high level of the heat assist control signal φ200 is associated with the first value OP1 of the output of the light source 5a, and the low level of the heat assist control signal φ200 is associated with the second value OP2 of the output of the light source 5a.

The heat assist current control unit 301 generates the drive current 58 according to the heat assist control signal φ200 and the heat assist current setting 300 to supply to the magnetic head 5. When the heat assist control signal φ200 is at the high level, the heat assist current control unit 301 generates the drive current 58 to supply to the light source 5a such that the output of the light source 5a is at the first value OP1. When the heat assist control signal φ200 is at the low level, the heat assist current control unit 301 generates the drive current 58 to supply to the light source 5a or turns off the drive current 58 not to supply to the light source 5a such that the output of the light source 5a is at the second value OP2.

For example, at timing T1 shown in FIG. 5, the heat assist current control unit 301, according to the heat assist control signal φ200 being kept at the high level, keeps the drive current at a first current value I1 so that the output of the light source 5a is kept at the first value OP1.

At timing T5, the heat assist current control unit 301, according to the heat assist control signal φ200 changing from the high level to the low level, changes the drive current from the first current value I1 to a second current value I2 so that the output of the light source 5a changes from the first value OP1 to the second value OP2.

At timing T7, the heat assist current control unit 301, according to the heat assist control signal φ200 changing from the low level to the high level, changes the drive current from the second current value I2 to the first current value I1 so that the output of the light source 5a changes from the second value OP2 to the first value OP1.

At timing T8, the heat assist current control unit 301, according to the heat assist control signal φ200 being kept at the high level, keeps the drive current at the first current value I1 so that the output of the light source 5a is kept at the first value OP1.

Figure 6:
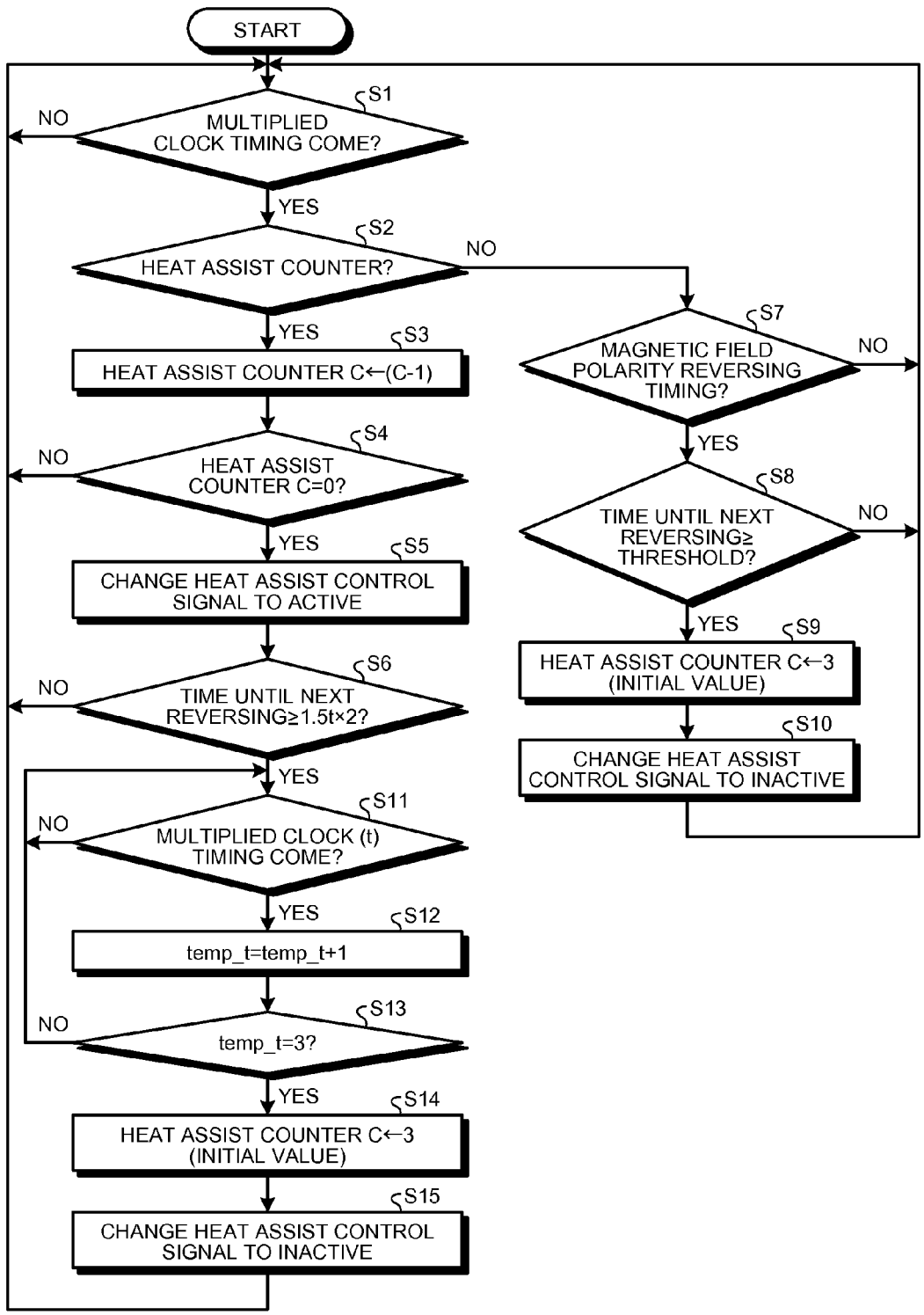
FIG. 6 is a flow chart showing operation of the magnetic disk device according to the embodiment.

Next, the operation of the magnetic disk device 100 will be described using FIG. 6. FIG. 6 is a flow chart showing operation of the magnetic disk device 100.

The RDC 124 waits for a rise timing or fall timing of the frequency-multiplied clock φ64 (No at step S1) and when a rise timing or fall timing of the frequency-multiplied clock φ64 has come (Yes at step S1), determines whether a heat assist counter CNT1 exists (step S2).

The heat assist counter CNT1 is a counter that is created in the RDC 124 (in the heat assist control signal generating circuit 163) to count the elapsed time from the timing when the heat assist control signal φ230 is changed from the high level to the low level (e.g., the elapsed time from timing T10 shown in FIG. 5). A count value C in units of half the period of the frequency-multiplied clock φ64 is set in the heat assist counter CNT1.

If the heat assist counter CNT1 exists (Yes at step S2), then the RDC 124 decrements the count value C of the heat assist counter CNT1 (step S3). The RDC 124 determines whether the count value C of the heat assist counter CNT1 is zero (step S4). If the count value C of the heat assist counter CNT1 is not zero (No at step S4), then the process returns to step S1. If the count value C of the heat assist counter CNT1 is zero (Yes at step S4), then the RDC 124 changes the heat assist control signal φ230 from the low level (inactive) to the high level (active) (step S5) and eliminates the heat assist counter CNT1. At the same time, the RDC 124 creates a heat assist counter CNT2 and sets the count value temp_t of the heat assist counter CNT2 to an initial value (0).

The heat assist counter CNT2 is a counter that is virtually created in the RDC 124 (in the heat assist control signal generating circuit 163) to count the elapsed time from the timing when the heat assist control signal φ230 is changed from the low level to the high level (e.g., the elapsed time from timing T12 shown in FIG. 5). The count value temp_t in units of half the period of the frequency-multiplied clock φ64 is set in the heat assist counter CNT2.

The RDC 124 compares the time (second time) from the timing when it has changed the heat assist control signal φ230 from the low level to the high level until the timing when the magnetic field reverses the next time with the third threshold (1.5 t×2) and determines whether the second time is greater than or equal to the third threshold according to the comparison result (step S6). If the second time is less than the third threshold (No at step S6), the RDC 124 returns the process to step S1.

On the other hand, if the heat assist counter CNT1 does not exist (No at step S2), then the RDC 124 determines whether the timing when the magnetic field is to be reversed has come (step S7). If the timing when the magnetic field is to be reversed has not come (No at step S7), the process returns to step S1. If the timing when the magnetic field is to be reversed has come (Yes at step S7), the RDC 124 compares the time (first time) until the timing when the magnetic field is to be reversed the next time with the first threshold and determines whether the first time is greater than or equal to the first threshold according to the comparison result (step S8). If the first time is less than the first threshold (No at step S8), the RDC 124 returns the process to step S1. If the first time is greater than or equal to the first threshold (Yes at step S8), then the RDC 124 creates the heat assist counter CNT1 and sets the count value C of the heat assist counter CNT1 to an initial value (3) (step S9) and changes the heat assist control signal φ230 from the high level (active) to the low level (inactive) (step S10). Then, the process returns to step S1.

If the second time is greater than or equal to the third threshold (Yes at step S6), then the RDC 124 waits for a rise timing or fall timing of the frequency-multiplied clock φ64 (No at step S11). When a rise timing or fall timing of the frequency-multiplied clock φ64 has come (Yes at step S11), then the RDC 124 increments the count value temp_t of the heat assist counter CNT2 (step S12). The RDC 124 determines whether the count value temp_t of the heat assist counter CNT2 is at 3 (step S13). If the count value temp_t of the heat assist counter CNT2 is not at 3 (No at step S13), then the process returns to step S11. If the count value temp_t of the heat assist counter CNT2 is at 3 (Yes at step S13), then the RDC 124 eliminates the heat assist counter CNT2. Then, the RDC 124 creates the heat assist counter CNT1 and sets the count value C of the heat assist counter CNT1 to an initial value (3) (step S14) and then changes the heat assist control signal φ230 from the high level (active) to the low level (inactive) (step S15) and returns the process to step S1.

As described above, in the present embodiment, in the magnetic disk device 100, the RDC 124 switches between the first control and the second control according to the pulse width of data to be written onto the magnetic disk 50. The first control is control which keeps the output of the light source 5a at the first value. The second control is control which makes the output of the light source 5a change periodically between the first value and the second value. The second value is lower than the first value. The RDC 124 performs the first control when the pulse width of data to be written onto the magnetic disk 50 is less than the first threshold, and performs the second control when the pulse width of data to be written onto the magnetic disk 50 is greater than or equal to the first threshold.

Figure 8:
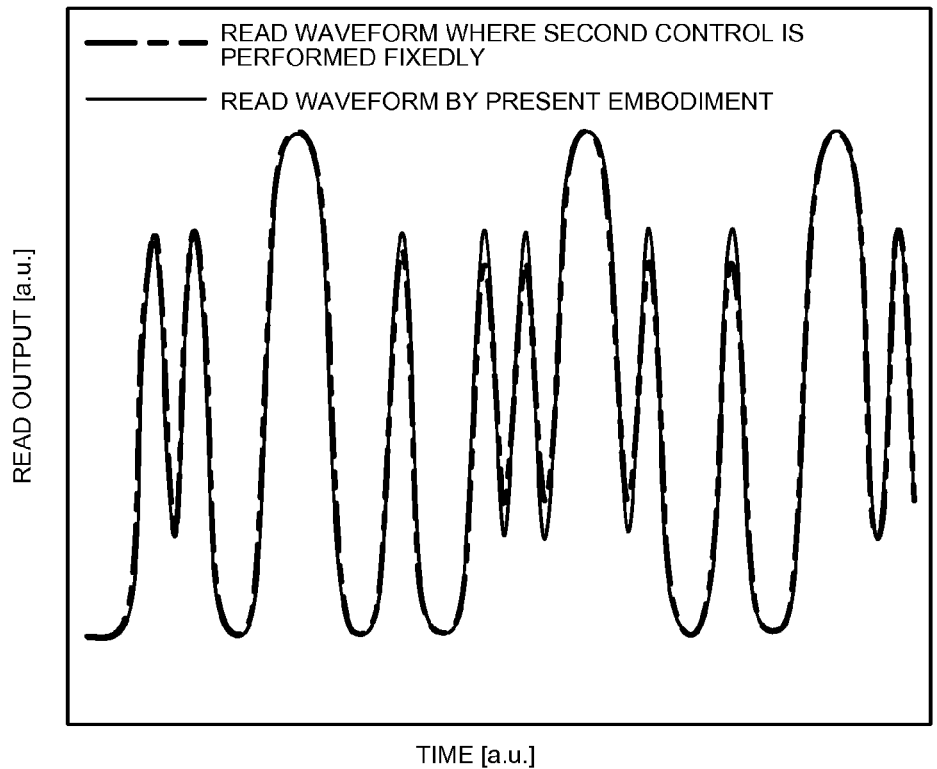
FIG. 8 is a graph for explaining an effect of the embodiment.
Figure 9:
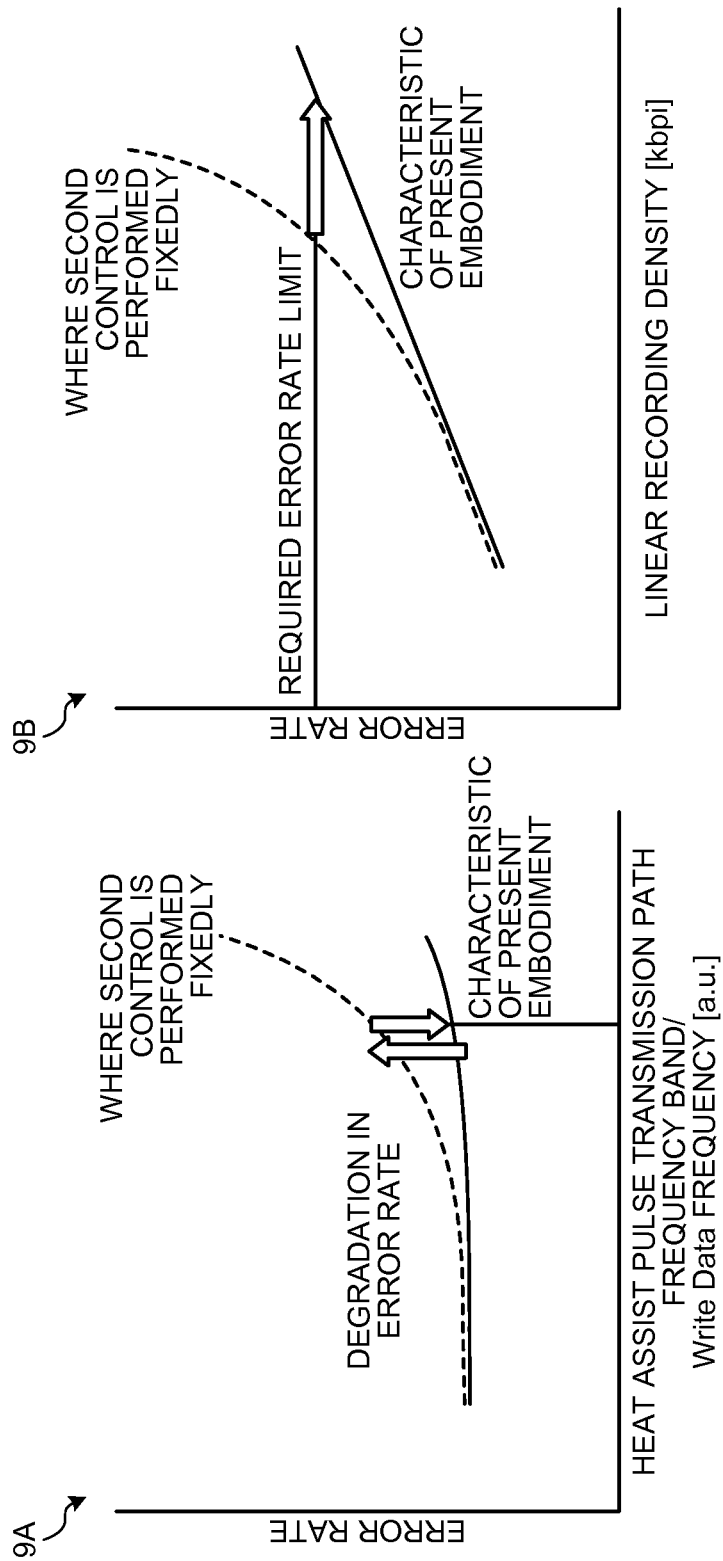
FIG. 9 is a graph for explaining an effect of the embodiment.

With this performance, the reliability of data written on the magnetic disk 50 can be improved as compared with the case of performing the second control in a fixed manner. For example, as shown in FIG. 8, when the pulse width of data to be written onto the magnetic disk 50 is short, the amplitude of the data can be secured as compared with the case of performing the second control in a fixed manner, and hence the reliability of data written is improved. Thus, as shown in 9A of FIG. 9, the error rate for the same frequency can be decreased as compared with the case of performing the second control in a fixed manner, and hence the reliability of write operation can be improved. Further, as shown in 9B of FIG. 9, the linear recording density for the same error rate can be improved as compared with the case of performing the second control in a fixed manner, and hence the recording density in write operation can be improved. FIGS. 8 and 9 are graphs for explaining effects of the present embodiment in comparison with the case of performing the second control in a fixed manner.

Figure 10:
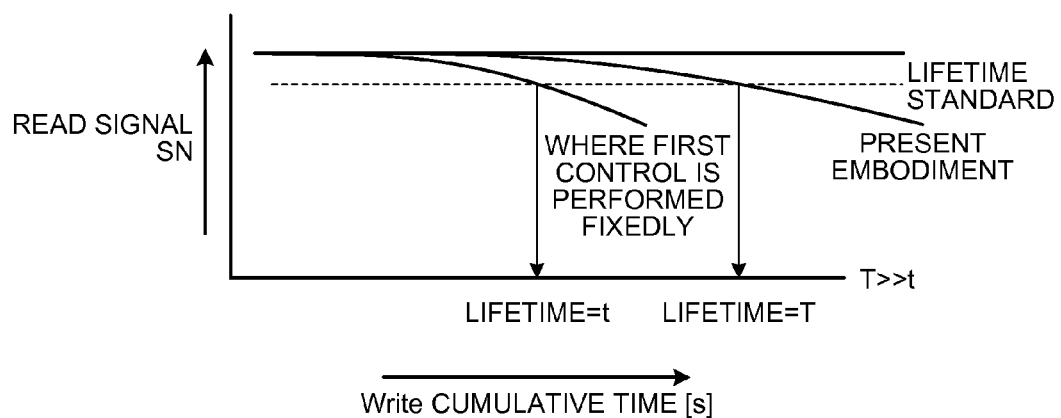
FIG. 10 is a graph for explaining an effect of the embodiment.
Figure 11:
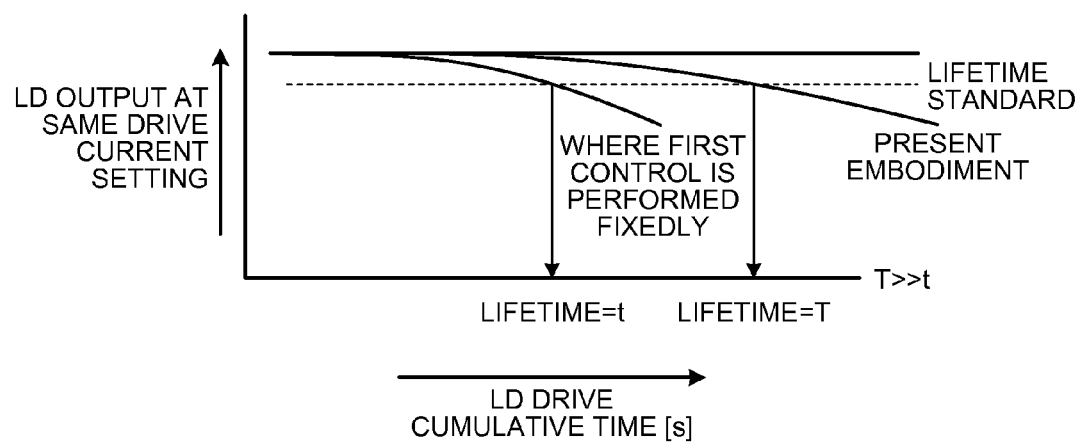
FIG. 11 is a graph for explaining an effect of the embodiment.

Further, because the time-averaged amount of current supplied to the light source 5a can be reduced as compared with the case of performing the first control in a fixed manner, power consumption in the light source 5a can be reduced. Yet further, because constant light power need not continue to be supplied from the light source 5a to the near field transducer 5c at recording, the degradation due to heat generation of the light source 5a can be suppressed, and the degradation due to heat generation of the near field transducer 5c receiving light from the light source 5a can be suppressed as compared with the case of performing the first control in a fixed manner. Thus, as shown in FIGS. 10, 11, the lifetimes of the light source 5a and the near field transducer 5c can be elongated, thus suppressing a decrease in the reliability of the light source 5a and the near field transducer 5c. FIGS. 10, 11 are graphs for explaining effects of the present embodiment in comparison with the case of performing the first control in a fixed manner.

Therefore, according to the present embodiment, the reliability of data written on the magnetic disk 50 can be improved while elongating the lifetimes of the light source 5a and the near field transducer 5c and lowering the power consumption of the light source 5a. Further, signal quality can be improved, and storage capacity can be increased.

Note, although the above embodiment describes illustratively the case where the output of the light source 5a is controlled by controlling the drive current of the light source 5a, the output of the light source 5a may be controlled by controlling the drive voltage (drive signal) of the light source 5a.

Figure 12:
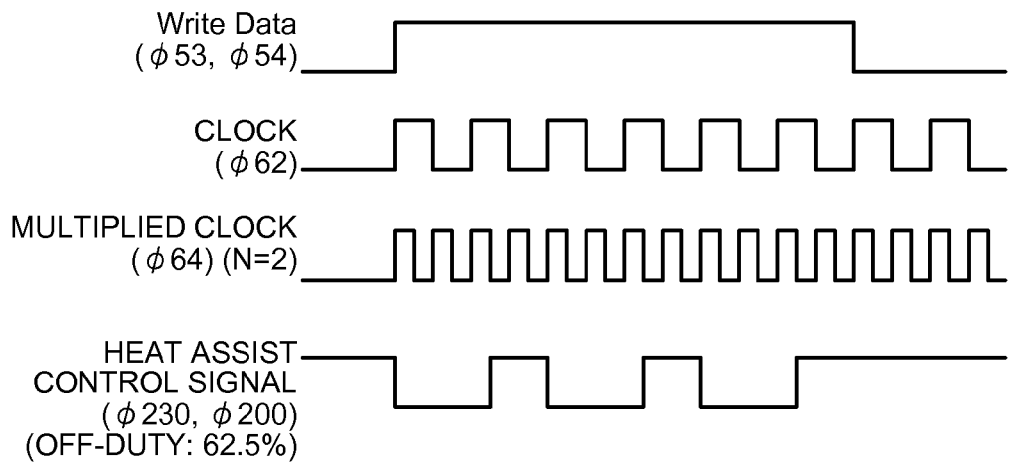
FIG. 12 is a waveform diagram showing operation of a magnetic disk device according to a modified example of the embodiment.

Alternatively, although the above embodiment shows in FIG. 5 the operation in the case where the frequency-multiplier factor N of the frequency-multiplied clock φ64 generated in the frequency-multiplied clock generating circuit 159 equals 1, the frequency-multiplier factor N of the frequency-multiplied clock φ64 may be greater than 1. For example, as shown in FIG. 12, the frequency-multiplier factor N of the frequency-multiplied clock φ64 may equal 2. In this case, since the period t/N of the frequency-multiplied clock φ64 is shorter than the period t of the clock φ62 for generating the data φ53 subject to writing, the off-duty of the heat assist control signal φ230 can be set more finely, and the off-duty of the heat assist control signal φ230 can be made greater than 50%. For example, in the example shown in FIG. 12, the off-duty of the heat assist control signal φ230 in the second control can be set at 62.5%. Thus, the power consumption in the light source 5a can be further reduced as compared with the case of performing the first control in a fixed manner.

Figure 13:
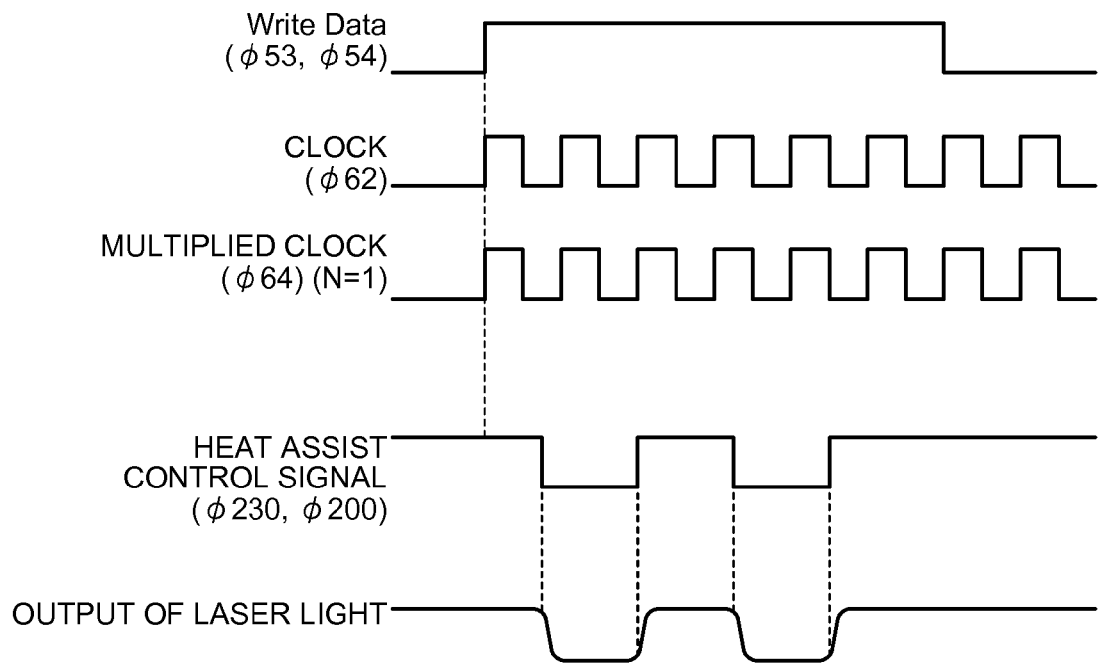
FIG. 13 is a waveform diagram showing operation of a magnetic disk device according to another modified example of the embodiment.

Alternatively, although the above embodiment shows illustratively the case where the data φ54 to be written and the heat assist control signal φ200 are made synchronous in a phase relation shown in FIG. 5, the RDC 124 may switch between the first control and the second control such that the timings when the output of the light source 5a becomes the second value and edge timings of the pulses of data to be written onto the magnetic disk 50 do not coincide. For example, as shown in FIG. 13, the RDC 124 may delay the timing when to switch between the first control and the second control with respect to the edge of the pulse of data to be written onto the magnetic disk 50. In this case, the predetermined delay amount in the delay circuit 140 shown in FIG. 3 and the predetermined delay amount in the delay circuit 142 should be adjusted such that the data φ54 to be written and the heat assist control signal φ200 are in a phase relation shown in FIG. 13. That is, the amount by which the predetermined delay amount in the delay circuit 140 is greater than the predetermined delay amount in the delay circuit 142 can be made slightly smaller than in this embodiment so that the data φ54 to be written and the heat assist control signal φ200 are in a phase relation shown in FIG. 13.

Alternatively, although the above embodiment shows illustratively the case where the second value OP2 is at an off level when the second control makes the output of the light source 5a change periodically between the first value OP1 and the second value OP2, the second value OP2 may be a value between the first value OP1 and the off level. Also in this case, because the time-averaged amount of current supplied to the light source 5a can be reduced, power consumption in the light source 5a can be reduced as compared with the case of performing the first control in a fixed manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a light source;
   a light irradiation element configured to receive light from the light source to irradiate light onto a magnetic disk; and
   a controller configured to keep an output of the light source at a first value when a first time from an edge timing of pulse of data to be written onto the magnetic disk until a next edge timing is less than a first threshold, and to change the output of the light source from the first value to a second value lower than the first value when the first time is greater than or equal to the first threshold.

2. The magnetic disk device according to claim 1, further comprising a recording head configured to write data onto the magnetic disk,
   wherein the light irradiation element irradiates light onto an area of the magnetic disk onto which data is to be written by the recording head.

3. The magnetic disk device according the claim 1, wherein the second value is a value at which the output of the light source is off, and
   wherein the controller controls the light source such that light is output intermittently from the light source when the first time is greater than or equal to the first threshold.

4. The magnetic disk device according to claim 1, wherein the second value is a value between the first value and a value at which the output of the light source is off.

5. The magnetic disk device according to claim 1, wherein the controller keeps the output of the light source at the second value when an elapsed time from timing when it has changed the output of the light source from the first value to the second value is less than a second threshold, and changes the output of the light source from the second value to the first value when the elapsed time is greater than or equal to the second threshold.

6. The magnetic disk device according to claim 1, wherein the controller changes the output of the light source such that a timing when the output of the light source becomes the second value and an edge timing of pulse of data to be written onto the magnetic disk do not overlap with each other.

7. The magnetic disk device according to claim 6, wherein the controller delays the timing of the switching with respect to the edge of the pulse.

8. The magnetic disk device according to claim 1, wherein the controller comprises:
   a determining unit configured to compare a pulse width of data to be written onto the magnetic disk with the first threshold to determine whether the pulse width is greater than or equal to the first threshold according to a comparison result; and
   a control signal generating unit configured to generate a control signal change the output of the light source according to a determination result of the determining unit,
   the magnetic disk device further comprising a preamp that generates a drive signal for the light source according to the generated control signal.

9. A controller which controls a light source in a magnetic disk device comprising a light irradiation element that receives light from the light source to irradiate light onto a magnetic disk, wherein the controller is configured to keep an output of the light source at a first value when a first time from an edge timing of pulse of data to be written onto the magnetic disk until a next edge timing is less than a first threshold, and to change the output of the light source from the first value to a second value lower than the first value when the first time is greater than or equal to the first threshold.

10. The controller according to claim 9, wherein
the control signal generating unit compares an elapsed time from timing when it has changed the output of the light source from the first value to the second value with a second threshold, and generates the control signal so as to keep the output of the light source at the second value when the elapsed time is less than the second threshold and to change the output of the light source from the second value to the first value when the elapsed time is greater than or equal to the second threshold, according to the comparison result.

11. The controller according to claim 9, wherein
the controller generates a first clock,
generates data to be written onto the magnetic disk synchronously with the first clock, and
compares a pulse width of the generated data with the first threshold synchronously with the first clock.

12. The controller according to claim 11, wherein
the controller frequency multiplies the first clock to generate a second clock, and
generates the control signal synchronously with the second clock.

13. The controller according to claim 11, wherein
the controller delays timing of the switching with respect to the edge of the pulse of the generated data.

14. A control method which controls a light source in a magnetic disk device having the light source and a light irradiation element that receives light from the light source to irradiate light onto a magnetic disk, the control method comprising:
keeping an output of the light source at a first value when a first time from an edge timing of pulse of data to be written onto the magnetic disk until a next edge timing is less than a first threshold; and changing the output of the light source from the first value to a second value lower than the first value when the first time is greater than or equal to the first threshold.

15. The control method according to claim 14, further comprising:
irradiating light onto an area of the magnetic disk onto which data is to be written by a head.

16. The control method according to claim 14, wherein
the second value is a value at which the output of the light source is off, and
the control method further comprises controlling the light source such that light is output intermittently from the light source when the first time is greater than or equal to the first threshold.

17. The control method according to claim 14, wherein
the second value is a value between the first value and a value at which the output of the light source is off.

18. The control method according to claim 14, wherein
the changing the output of the light source includes changing the output of the light source such that a timing when the output of the light source becomes the second value and an edge timing of pulse of data to be written onto the magnetic disk do not overlap with each other.

19. The control method according to claim 14, further comprising:
comparing a pulse width of data to be written onto the magnetic disk with the first threshold to determine whether the pulse width is greater than or equal to the first threshold according to a comparison result; and
generating a control signal to change the output of the light source according to a determination result of the determining unit,
generating a drive signal for the light source according to the generated control signal.

20. The control method according to claim 14, further comprising:
generating a first clock,
generating data to be written onto the magnetic disk synchronously with the first clock, and
comparing a pulse width of the generated data with the first threshold synchronously with the first clock.

* * * * *